United States Patent [19]
Ames et al.

[11] 4,034,598
[45] July 12, 1977

[54] METHOD FOR TESTING SEALS OF ELECTRICAL ENERGY STORAGE DEVICES

[75] Inventors: Allan E. Ames, Reading; Alfredo G. Kniazzeh; Paul Goldberg, both of West Newton, all of Mass.

[73] Assignee: Polaroid Corporation, Cambridge, Mass.

[21] Appl. No.: 671,288

[22] Filed: Mar. 29, 1976

[51] Int. Cl.² .......................................... G01M 3/04
[52] U.S. Cl. .................... 73/40; 73/49.3; 320/48; 324/29.5
[58] Field of Search ............. 73/37, 40, 49.3, 52, 73/432 SD; 324/29.5, 30 R; 320/48; 340/249; 429/90

[56] References Cited

U.S. PATENT DOCUMENTS

| | | | |
|---|---|---|---|
| 3,407,123 | 10/1968 | Peterson | 73/49.3 X |
| 3,927,367 | 12/1975 | Franklin et al. | 324/29.5 |
| 3,939,400 | 2/1976 | Steele | 324/29.5 |

Primary Examiner—Richard C. Queisser
Assistant Examiner—Charles Gorenstein
Attorney, Agent, or Firm—Philip G. Kiely

[57] ABSTRACT

Seal integrity tests are conducted on electrical energy storage devices, such as batteries, by the application, to the device under test, of oxygen at elevated pressures.

14 Claims, 2 Drawing Figures

METHOD FOR TESTING SEALS OF ELECTRICAL ENERGY STORAGE DEVICES

BACKGROUND OF THE INVENTION

One of the prerequisites to extended shelf life of electrical energy storage devices, such as batteries or condensers, is the integrity of the package or container enclosing the electrochemically active materials in the device. A leak, however minute or undetectable at the time of manufacture, will permit water from the electrolyte to evaporate at an undiscernible rate, resulting in a slow but continuous diminution in the electrical properties of the battery, resulting eventually in a low capacity or even in total failure. In addition, the entry of oxygen will deleteriously affect the condenser's or the battery's properties.

While such a problem of leakage is not as common in devices enclosed in a "can", such as the well known C and D cells, such leakage can occur. However, the leakage or pinhole problem is more widespread in the flat or planar batteries which are now being widely used. Such batteries are disclosed in, for example, U.S. Pat. Nos. 3,563,805; 3,617,387; 3,734,780; 3,770,504; and the like. Such planar batteries are generally enclosed in an envelope that has been suitably rendered air and moisture resistant by lamination with suitable polymeric materials, metal foils, wax-dipping and the application of other impermeable coatings. Similar problems are encountered in flat condensers.

That the problem of leakage is a serious one is attested to by the number of references in the literature to various adhesives and sealants which have been employed to alleviate this problem. However, as stated above, even though careful precautions have been taken and manufacturing procecures followed, batteries are still produced which upon manufacture appear perfectly acceptable, but which upon storage of several months are found to have failed. If the battery has been incorporated into a photographic film assembly as constituent component, for instance, as disclosed in U.S. Pat. No. 3,543,662, and then found, upon attempted usage of the film product, to have failed, then a greater loss has occurred than merely the loss attributed to a defective battery. It is highly desirable, therefore, to obtain a method for ascertaining as soon as possible after manufacture whether or not the battery will survive an extended shelf life.

A novel method for determining seal quality and hence the shelf life stability of an electrical energy storage device has now been found.

SUMMARY OF THE INVENTION

It has now been found that by subjecting an electrical energy storage device to gaseous oxygen at elevated pressures, the integrity of the container or envelope can be ascertained, thereby providing an accelerated aging evaluation of the device.

The term "electrical energy storage device", as used therein, is intended to refer to any electrical energy storage device, such as a battery or a condenser which contains an electrical component, for example, an anode or electrolyte, degradeable by oxygen. For convenience, the invention will be described primarily in terms of a battery.

By subjecting the battery to the oxygen at elevated pressures, the oxygen will seek any pinhole or other disruption in the battery envelope, and rapidly react with the anode material. This reaction, or lack thereof in a well sealed battery, can be ascertained by measuring the open circuit voltage (OCV) or by weighing the battery.

A BRIEF DESCRIPTION OF THE DRAWING

A DETAILED DESCRIPTION OF THE INVENTION

Figure 1:
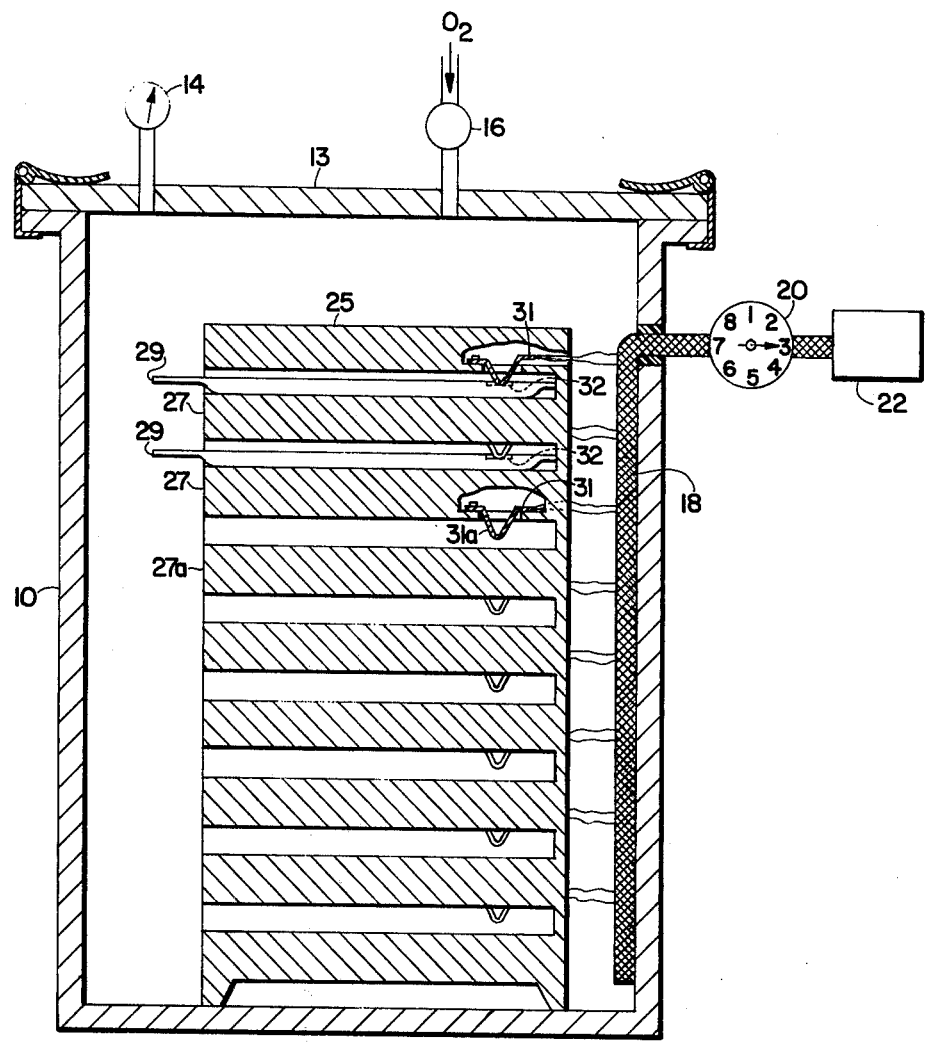
FIG. 1 is a fragmentary side view of one apparatus suitable for use in the present invention for carrying out the accelerated aging test.
Figure 2:
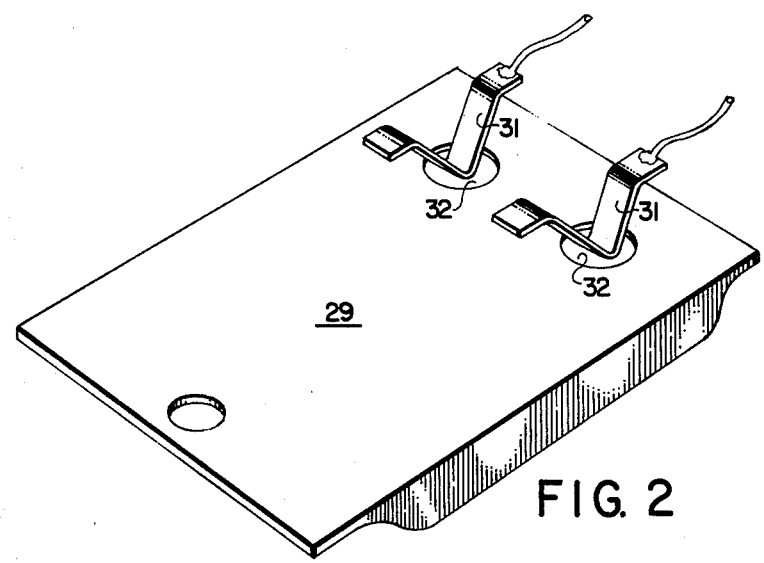
FIG. 2 is a fragmentary perspective view showing a battery in the apparatus of FIG. 1.

A battery's seal integrity is measured by subjecting the battery under test to oxygen at an elevated pressure and evaluating the effect or lack thereof of the oxygen on the anode material of the battery, by measuring the change (decrease) in the OCV, or by measuring the weight change (increase) in the battery. If the battery seal is intact, there will be substantially no change in the OCV, or battery weight. However, a defect in the battery envelope which would permit oxygen to enter the battery will be reflected in the above mentioned OCV change or weight increase. The quantum OCV or weight change over a given time will, of course, reflect the magnitude of the defect in the battery.

Without intending to be bound by theory, it is believed that as oxygen enters the battery a change in OCV will occur as a result of an increase in electrolyte pH. This is believed to be due to corrosion of the anode, and, in the case of a zinc anode, the attendant production of zinc oxide, which, when it dissolves in the salt electrolyte causes the pH increase. A decrease in OCV follows according to the known effect of pH on the zinc electrode. Similarly, the oxidation of zinc will effect a weight gain due to oxygen take-up. It is also believed that at relatively short oxygen exposure times, a decrease in OCV is produced by the zinc oxidation rate increasing the zinc polarization voltage.

As stated above, the shelf life stability of the battery can be predicted from the application of the oxygen by either measuring the change in the OCV or by masuring the weight gain. Obviously the more convenient method would be measuring the change in the OVC; therefore, by attaching a volt meter to the battery under test, enclosing the battery in a pressure container and applying oxygen, the OCV drop (if any) can be measured almost immediately, providing quick and reliable evaluation of the battery's potential shelf life. Alternatively, a change in the battery OCV may be measured by comparing OVC measurements before pressurizing the battery with oxygen, with OCV measurements after removal of the battery from the pressurized environment.

The novel procedure of the present invention is particularly suitable for use in planar-type LeClanche batteries, wherein the zinc anode is attacked by the oxygen, forming zinc oxide, which is reflected in measurable OCV change.

The term "oxygen" as used here is intended to refer to pure oxygen, as well as mixtures of oxygen with other gases. It is also intended to include air, which is approximately 20% oxygen. However, it is preferred that pure oxygen be employed in order to provide a rapid determination of the battery seal integrity.

As stated above, the oxygen is applied to the battery at elevated pressures. The term "elevated pressure" is intended to refer to pressures above ambient atmospheric pressure. While only a few points above atmospheric pressure may be employed satisfactorily, it is preferred to use pressures of 40 to 130 psig. By employing higher pressures, the test time is shortened. For example, at pressures of 40 psig and higher of oxygen, almost instantaneous measurements of the change in OCV can be made.

Referring now to the drawings, one device for testing a plurality of batteries according to the procedures of the present invention is disclosed. Pressure container 10, having removable top 13, with pressure gauge 14 and valving means 16 for the introduction and the discharge of oxygen, is provided. An electrical cable 18 capable of having a plurality of batteries wired thereto is provided in container 11 and passes through the wall of container 11 by means of a pressure seal, and is connected to selector switch 20 and volt meter 22. A removable rack 25 is provided, which contains a plurality of shelves 27, adapted to receive batteries under test. Batteries 29 are inserted into the shelves where the terminals 32 of the batteries engage clips 31, which in turn are wired to cable 18. After the insertion of the rack with the battery and the sealing of container 11, the container is pressurized with oxygen through valve 16 to the desired pressure, for example, 100 psig. After the appropriate length of time, such as 1 minute, by means of the selector switch the OVC of each battery is measured on a volt meter 22 in order to ascertain the OCV of the batteries under pressure. This measurement is then compared with a previously taken OCV prior to pressurization of the battery. A change in the OCV above a certain threshold level will indicate a potential failure of the battery, for example, a change in OCV of 20mv or more in a 6 volt planar battery exposed to 100% oxygen at 100 psig for two hours will indicate the presence of a poor seal. Those skilled in the art may readily correlate given changes in OCV or weight with shelf life (room temperature and pressure) experience to determine the amount of change in the accelerated test which will reasonably predict seal quality and hence shelf life.

For convenience, the clips 31 are spring biased so that merely sliding a battery onto the shelf will automatically engage the clips and the battery terminals. Shelf 27a is shown without a battery carried thereon and with clip 31a is an unengaged position.

A series of batteries were subjected to the oxygen test of the present invention to ascertain the potential shelf life characteristics. The batteries employed were the 6 volt planar type described above. The initial OCV of the batteries was obtained and the batteries were then subjected to 130 psig of 100% oxygen in a chamber for 22 hours. Following removal from the chamber the $-\Delta OCV$ and weight gain were measured. Any battery with a $-\Delta OCV$ of more than 20mv was rejected as a potential failure. The following table shows the data obtained from the test.

| Battery No. | OCV Before Test (mv) | $-\Delta OCV$ (mv) | $+\Delta Weight$ (mg) |
|---|---|---|---|
| 1 | 6063 | 400 | 30 |
| 2 | 5716 | 700 | 25 |
| 3 | 6411 | 64 | 20 |
| 4 | 6433 | 105 | 10 |
| 5 | 6415 | 185 | 30 |
| 6 | 6433 | 347 | 10 |
| 7 | 6403 | 136 | 13 |
| 8 | 6454 | 7 | 4 |
| 9 | 6449 | 65 | 4 |
| 10 | 6456 | 0 | 0 |

-continued

| Battery No. | OCV Before Test (mv) | $-\Delta OCV$ (mv) | $+\Delta Weight$ (mg) |
|---|---|---|---|
| 11 | 6454 | 7 | −1 |
| 12 | 6463 | 6 | 1 |
| 13 | 6199 | 257 | 36 |
| 14 | 6464 | 6 | 1 |
| 15 | 6464 | 6 | 0 |
| 16 | 6447 | 183 | 26 |
| 17 | 6458 | 6 | 0 |

It has been found that low $-\Delta OCV$ and low weight gain is in fact related to good battery reliability with time in contrast to those which show greater changes.

For batteries of the planar type, the OCV is a more convenient method of ascertaining seal integrity while for other types of batteries weight gain may be the preferred criterion.

It will be understood that the test provided by this invention may be used to sample a portion of a given lot of batteries if preferred, particularly if it is assumed that the sample group is representative of the total group.

What is claimed is:

1. A method for determining the seal integrity of an electrical energy storage device which comprises measuring the open circuit voltage of a device, subjecting the device to an oxygen atmosphere at an elevated pressure and measuring the open circuit voltage of the thus treated device.

2. The method as defined in claim 1 wherein said device is a battery.

3. The method as defined in claim 1 wherein said device is a condenser.

4. The method as defined in claim 1 wherein said pressure is at least 40 psig.

5. The method as defined in claim 4 wherein said pressure is at least 130 psig.

6. The method as defined in claim 1 wherein said oxygen atmosphere is air.

7. The method as defined in claim 1 wherein said oxygen atmosphere is substantially 100% oxygen.

8. The method as defined in claim 2 wherein said battery is a planar battery.

9. A method for determining the seal integrity of batteries which comprises the steps of measuring the open circuit voltage of a battery, subjecting the battery to about a 100% oxygen atmosphere at at least 100 psig for about one minute and then measuring the open circuit voltage of the thus treated battery.

10. The method as defined in claim 9 wherein said open circuit voltage in the thus subjected battery is determined after removal of the battery from the oxygen and pressure.

11. A method for determining the seal integrity of an electrical energy storage device which comprises the steps of measuring the weight of the device, subjecting the device to an oxygen atmosphere at an elevated pressure, and again measuring the weight of the thus tested device.

12. The method as defined in claim 11 wherein said device is a battery.

13. A method for determining the seal integrity of a plurality of electrical energy storage devices which comprises measuring the open circuit voltage of said devices, subjecting said devices to an oxygen atmosphere at an elevated pressure and sequentially measuring the open circuit voltage of said devices while under said oxygen atmosphere and said elevated pressure.

14. The method as defined in claim 13 wherein said devices are batteries.

* * * * *